United States Patent [19]

Sheridan et al.

[11] 4,239,739
[45] Dec. 16, 1980

[54] MANUFACTURE OF PURIFIED DIAMMONIUM PHOSPHATE

[75] Inventors: Richard C. Sheridan, Sheffield; John F. McCullough, Florence, both of Ala.

[73] Assignee: Tennessee Valley Authority, Muscle Shoals, Ala.

[21] Appl. No.: 91,853

[22] Filed: Nov. 6, 1979

[51] Int. Cl.³ ............................................. C01B 15/16
[52] U.S. Cl. .................................................. 423/308
[58] Field of Search ............................... 423/308, 311

[56] References Cited

U.S. PATENT DOCUMENTS 3,920,796 11/1975 Sheridan .............................. 423/313

Primary Examiner—Wayne A. Langel
Attorney, Agent, or Firm—Robert A. Petrusek

[57] ABSTRACT

Purified diammonium phosphate is produced by neutralizing relatively pure melamine orthophosphate, prepared from wet-process phosphoric acid, with ammonia in a hot solution of diammonium phosphate to give a slurry of melamine in concentrated diammonium phosphate solution. The liberated melamine is virtually insoluble in concentrated diammonium phosphate solutions; it is filtered from the hot mixture, washed, and recycled to produce more melamine phosphate by reaction with wet-process phosphoric acid. The hot, concentrated diammonium phosphate filtrate is cooled to precipitate purified diammonium phosphate crystals. The product is separated from its mother liquor by filtration, and the resulting filtrate is recycled to the reactor. The small amount of impurities introduced with the melamine phosphate are removed partly with the liberated melamine and partly by centrifugation of the diammonium phosphate solution. The only starting materials for the process are phosphoric acid and ammonia.

4 Claims, 2 Drawing Figures

FLOW DIAGRAM FOR PRODUCTION OF DIAMMONIUM PHOSPHATE FROM MELAMINE PHOSPHATE

FLOW DIAGRAM FOR PRODUCTION OF DIAMMONIUM PHOSPHATE FROM MELAMINE PHOSPHATE

SOLUBILITY OF MELAMINE IN DIAMMONIUM
PHOSPHATE SOLUTION

MANUFACTURE OF PURIFIED DIAMMONIUM PHOSPHATE

The invention herein described may be manufactured and used by or for the Government for governmental purposes without the payment to us of any royalty therefor.

BACKGROUND OF THE INVENTION

The present invention relates to the production of ammonium phosphate, and more particularly, the present invention relates to an improved process for the production of relatively pure diammonium orthophosphate (DAP) from impure wet-process phosphoric acid (WPA). It is commercially desirable to utilize such wet-process phosphoric acid rather than the purer electric furnace acid in the production of feed-grade, solution fertilizer-grade, and technical-grade diammonium phosphates. These upgraded phosphates are established commercial chemicals and are used in animal feed supplements, liquid fertilizers, detergents, and other uses.

Generally, wet-process phosphoric acid is exceedingly impure for such uses. It is ordinarily prepared by acidulation of phosphate rock and contains relatively large amounts of acid-soluble impurities, such as sulfates, fluorides, and fluosilicates, salts of aluminum, magnesium, iron, calcium, and other metals as well as dissolved and suspended organic matter. These may vary, for example, in filter-grade acid from 2.5 to 3.0 percent $SO_3$, 2 to 3 percent fluorine, 1.25 to 1.75 percent $Fe_2O_3$, 1.25 to 1.6 percent alumina, and 0.25 to 0.4 percent CaO, though the quantities set forth above are only illustrative and are quite variable.

Ammoniation of the impure wet-process acid to form diammonium phosphate causes most of the metallic and fluorine-containing impurities to precipitate in the form of gels and/or very finely dispersed solids. These gels or finely dispersed solids settle very slowly and blind filter media, which makes their separation from the solution too difficult to be practical on an industrial scale. Thus, when diammonium phosphate is crystallized from the solution, the slurry contains the precipitated impurities. Because of the above described properties of the precipitated impurities, it is impractical to separate them from the diammonium phosphate crystals by selective filtration or other means and, in addition, they make separation of the diammonium phosphate from the mother liquor by filtration or centrifugation exceedingly difficult.

Various methods for purifying wet-process acid have been tried. These include ion exchange, dialysis, selective crystallization, solvent extraction, and solvent precipitation. For economic or technical reasons, none of these methods have gained extensive industrial acceptance.

One recent breakthrough in overcoming the disadvantages of wet-process phosphoric acid is taught and described by Sheridan in U.S. Pat. No. 3,920,796, Nov. 18, 1975, the teachings of which are incorporated herein. Sheridan teaches that melamine is added to impure wet-process phosphoric acid to form crystals of relatively pure melamine orthophosphate, $C_3N_3(NH_2)_3 \cdot H_3PO_4$, which are separated from the mother liquor and caused to react with an aqueous solution of ammonia, thereby forming crystals of melamine for recycle and a solution of purified diammonium phosphate. As may be seen from said teachings of Sheridan, specifically but not exclusively FIG. 1 thereof and the attendant descriptive material in the specification, the bulk of impurities which are usually a problem associated with the wet-process phosphoric acid are separated from the melamine phosphate cake via the filtrate from Sheridan's filter 2. The melamine process as taught by Sheridan, supra, provides an improved process for the production of ammonium phosphates; however, it does not produce solid, crystalline diammonium phosphate without the use of expensive, energy-consuming evaporation or other dewatering procedures.

SUMMARY OF THE INVENTION

According to the present invention, diammonium phosphate is produced by a process which comprises reacting melamine orthophosphate prepared from wet-process acid with ammonia in a hot solution of diammonium phosphate to produce a mixture of solid melamine and a concentrated solution of diammonium phosphate. The said melamine is virtually insoluble in concentrated diammonium phosphate solution and it is filtered from the hot solution, washed and recycled to produce more melamine phosphate. The resulting diammonium phosphate filtrate is cooled to precipitate purified diammonium phosphate crystals as product. The said diammonium phosphate product is separated from its mother liquor by filtration or centrifugation, and the filtrate from this operation is recycled to the reactor. Part of the impurities in the melamine phosphate are removed with the melamine, and nearly all of the remaining impurities are separated from the diammonium phosphate solution by centrifugaton or other suitable means. Thus, the only starting materials consumed in our novel process are phosphoric acid and ammonia.

Accordingly, an object of the present invention is the production of commercially pure diammonium phosphate from relatively impure wet-process phosphoric acid.

A further object of the present invention is to provide an improved process for producing relatively pure diammonium phosphate from melamine orthophosphate, said melamine orthophosphate, in turn, prepared from relatively impure wet-process phosphoric acid.

Still another object of the present invention is to recover as a crystalline solid product diammonium phosphate from a slurry comprising a concentrated diammonium phosphate solution and solid melamine with a minimum of evaporation or other costly dewatering procedures.

A still further object of the present invention is to recover as a crystalline solid product diammonium phosphate from a slurry comprising a concentrated diammonium phosphate solution and solid melamine with a minimum of evaporation or other costly dewatering procedures, and to further recover as byproduct melamine in essentially quantitative yield from the reaction mixture for recycle.

Other objectives and advantages of the process of this invention will be apparent and obvious from the description of the preferred embodiments and drawings which follow.

BRIEF DESCRIPTION OF THE DRAWINGS

With reference to the preferred embodiments of the present invention, the following drawings are included.

DESCRIPTION OF THE PREFERRED EMBODIMENT

Figure 1:
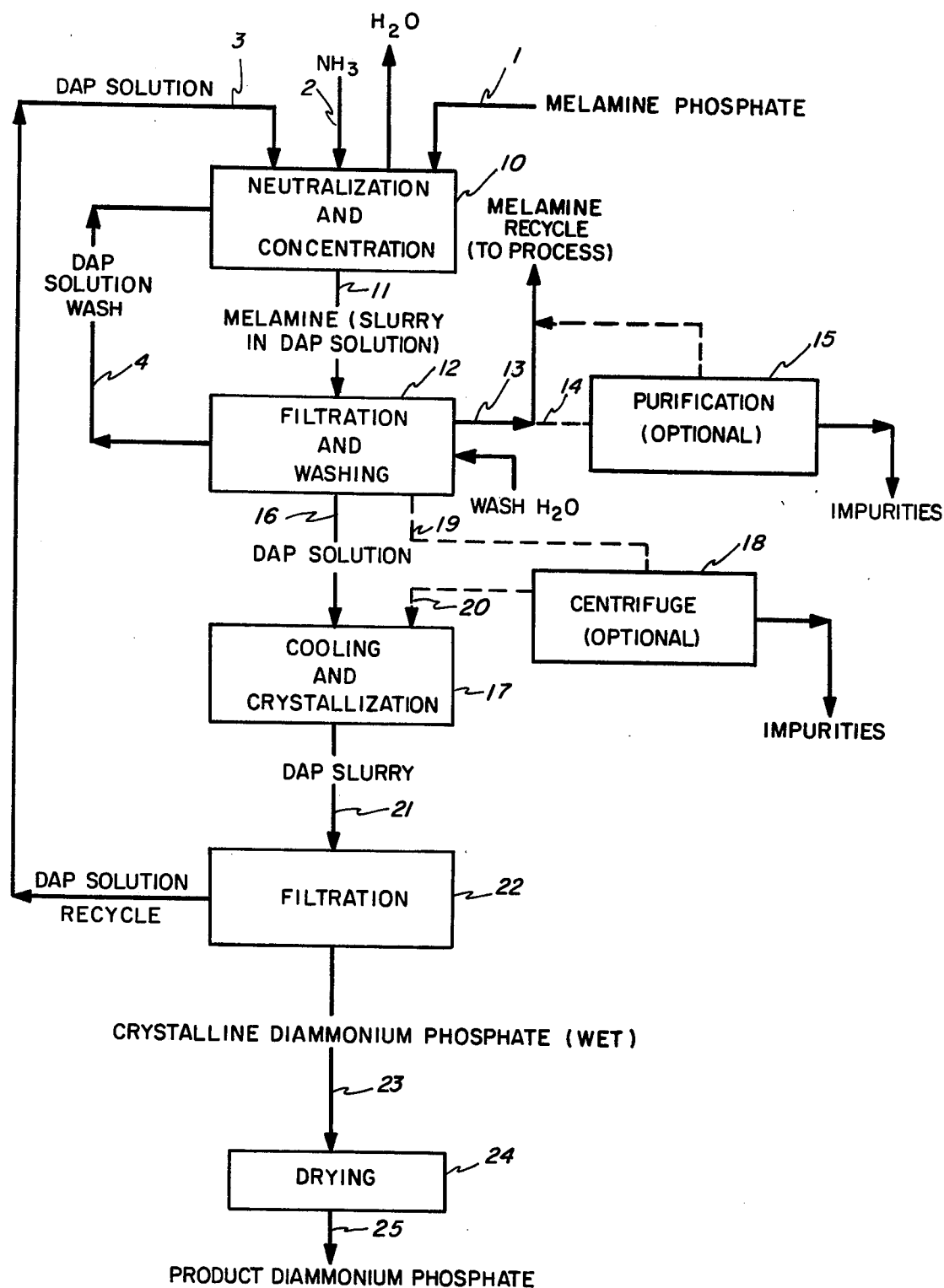
FIG. 1 represents a flow diagram of the principal embodiment of the present invention.

Referring now more specifically to FIG. 1 of the drawings, a flow diagram generally illustrating one principal embodiment of the process of the present invention is shown wherein a stream of relatively pure melamine phosphate previously prepared from wet-process phosphoric acid is passed via line 1 into reactor 10 from a source not shown. Simultaneously, a stream of anhydrous ammonia, also from a source not shown, is fed via line 2 into reactor 10 in an amount sufficient to neutralize the melamine phosphate therein and convert it into melamine and diammonium phosphate. Concurrently therewith a stream of concentrated diammonium phosphate solution recycled from a later mentioned diammonium phosphate slurry filtration means 22 is fed via line 3 into reactor 10 along with a stream of dilute diammonium phosphate solution via line 4 to reactor 10. The source of the said dilute diammonium phosphate solution is filtration and washing means 12 directly downstream from reactor 10. Water equal to that added to the process with the melamine phosphate and by washing operation means 12 minus that removed with the diammonium phosphate crystals is evaporated in reactor 10. The reaction product therein is a slurry of solid melamine suspended in a highly concentrated solution of diammonium phosphate.

Said slurry of melamine in diammonium phosphate solution is fed from reactor 10 via line 11 to the filtering and washing means 12 wherein the melamine is separated from the diammonium phosphate solution. The resulting filter cake of melamine in means 12 is washed with water to remove adhering phosphate solution. The resulting wash water from means 12 is fed via line 4 to reactor 10 to recover the $P_2O_5$ values therein. The resulting melamine is withdrawn from means 12 via line 13 and is utilized in the production of more melamine phosphate by reaction with wet-process phosphoric acid in a step not shown and may be subsequently introduced into reactor 10 via line 1. If desired, a side stream of said melamine may be removed via lines 13 and 14 and purified by recrystallization or other suitable means to avoid the buildup of impurities in the recycled melamine as illustrated by optional purification means 15. The hot, concentrated diammonium phosphate solution from filtration and washing means 12 is fed via line 16 into cooling and crystallizing means 17 wherein solid diammonium phosphate crystals are formed as the solution cools below its saturation point. Optional operation separating means 18 provides for the removal by centrifugation or other suitable means of finely divided, suspended impurities from the diammonium phosphate solution withdrawn from means 12 via line 19 and subsequently introduced via line 20 into cooling and crystallization operation means 17. The resulting cooled slurry of diammonium phosphate crystals is subsequently withdrawn from means 17 via line 21 into diammonium phosphate slurry filtration means 22 wherein the crystalline diammonium phosphate is separated and the diammonium phosphate solution is recycled via line 3 back to reactor 10. Said diammonium phosphate crystals are withdrawn from means 22 via line 23 and are introduced into dryer means 24 wherein residual adhering moisture is evaporated. The resulting dried diammonium phosphate is removed from means 24 via line 25 as product.

Figure 2:
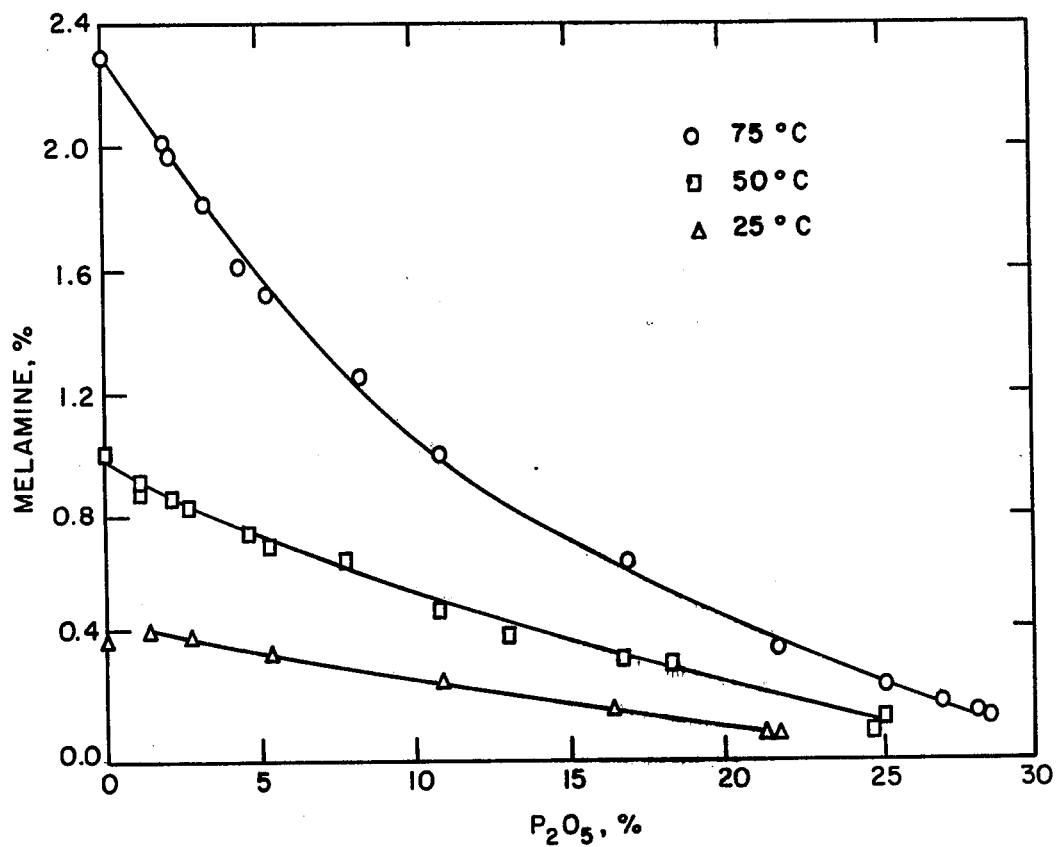
FIG. 2 is a graphical representation of the solubility of melamine in diammonium phosphate solutions.

Referring now more particularly to FIG. 2, the separation of melamine in the process described above is shown in relation to a solubility plot of the melamine-water-diammonium phosphate system.

The abscissa of the graph of FIG. 2 is the diammonium phosphate content of the solution expressed as percent by weight $P_2O_5$, while the ordinate is the melamine content of said solution expressed as percent by weight melamine. FIG. 2 shows that the solubility of melamine decreases as the diammonium phosphate concentration increases. This is true over the entire temperature range studied, but the effect is much more marked at 75° C. than at 25° or 50° C. In concentrated solutions containing 25 percent or more $P_2O_5$, the solubility of melamine is almost as low at 75° C. as it is at 25° C. This discovery permits almost quantitative crystallization of melamine from diammonium phosphate solutions by ammoniation of melamine phosphate. The quantity of melamine that dissolves in the hot, concentrated diammonium phosphate solution is so small that the loss of melamine by cocrystallization with the diammonium phosphate product is negligible both from an economic viewpoint and from its effect on the properties of said diammonium phosphate product.

In order that those skilled in the art may better understand how the present invention can be practiced and more fully and definitely understood, the following examples are given by way of illustration and not necessarily by way of limitation.

EXAMPLE I

Melamine phosphate (112.0 grams) made from reagent-grade chemicals was added in small portions to a solution of diammonium phosphate (145 grams) dissolved in water (200 mL). At the same time, gaseous ammonia was sparged into the reaction mixture to maintain the pH between 8.0 and 8.5. The temperature of the mixture rose to 65° C. as the melamine phosphate was added during a 10- to 12-minute period. The mixture was heated for 5 minutes at about 70° C. and then filtered immediately under vacuum on a medium-porosity frit to separate the melamine. The filtration rate was rapid for laboratory conditions. The clear filtrate, now free of melamine except for an insignificant amount in solution, was cooled to 25° C. to crystallize the product diammonium phosphate. The dried product weighed 62.8 grams, and x-ray analysis showed that it was pure diammonium phosphate. The melamine cake was sucked down, washed with two 100-mL portions of cold water, and dried at 75° C. The first wash contained 4.90 grams of diammonium phosphate and the second contained 1.47 grams. The dried melamine weighed 60.7 grams (96.3 percent recovery), and x-ray analysis showed that it was pure melamine. The purity was confirmed by chemical analysis (calculated 66.7 percent N; found 66.5 percent N and 0.005 percent $P_2O_5$). Most of the unrecovered melamine was dissolved in the wash from which it would be recovered in an ongoing commercial process.

EXAMPLE II

Melamine phosphate (50.0 grams) prepared from impure phosphoric acid, said acid containing 0.07 percent Mg, 0.74 percent Al, 0.71 percent Fe, 1.7 percent F, and 7.4 percent $SO_4$ was added with stirring to diammonium phosphate (186.0 grams) solution made from impure phosphate and saturated at 0° C. At the same time, gaseous ammonia was passed into the phosphate solution to maintain the pH at 9.0. The reactor was immersed in a bath regulated at 40° C. The melamine phosphate was added during a 10-minute period, and the mixture was stirred an additional 10 minutes before filtering to recover the melamine. The melamine cake was washed with two 50-ml portions of water and dried in an oven at about 75° C. The diammonium phosphate filtrate was cooled to 0° C. to crystallize the diammonium phosphate. The dried diammonium phosphate product weighed 17.84 grams. It was identified by x-ray and chemical analysis. The chemical analysis showed that it contained only 1.3 to 2.0 percent of the Mg, Al, Fe, F, and $SO_4$ impurities that were in the melamine phosphate charge. The washed and dried melamine weighed 29.60 grams, and chemical analysis showed it to contain 97.0 percent of the nitrogen, 5.8 percent of the phosphate, 44.5 percent of the Mg, 28.9 percent of the Al, 20.9 percent of the Fe, 16.4 percent of the F, and 0.8 percent of the sulfate that was in the melamine phosphate charge. The remainder of the Mg, Al, Fe, F, and sulfate impurities were present in the filtrate as finely divided particles which passed through the filter. In a process, these suspended impurities would be removed by centrifugation or other means. Most of the unrecovered melamine was dissolved in the wash water from which it would be recovered in a process.

EXAMPLE III

Another test was made using exactly the same conditions and procedure as in Example II, supra, except that the pH of the reaction mixture was maintained at 9.2 and the temperature was adjusted to 60° C. The recovered melamine weigned 27.26 grams and it contained 92.4 percent of the nitrogen, 2.7 percent of the phosphate, 20.5 percent of the Mg, 8.1 percent of the Al, 5.4 percent of the Fe, 3.9 percent of the F, and 0.7 percent of the sulfate that was in the melamine phosphate charge. The diammonium phosphate product weighed 17.79 grams and it contained 9.0 percent of the Mg, 13.0 percent of the Al, 10.0 percent of the Fe, 16.3 percent of the F, and 11.1 percent of the $SO_4$ that was in the melamine phosphate charge. The remainder of the Mg, Al, Fe, F, and sulfate impurities were present in the filtrate as finely divided particles which passed through the filter. In a process, these suspended impurities would be removed by centrifugation or other means. Most of the unrecovered melamine was dissolved in the wash water from which it would be recovered in a process.

EXAMPLE IV

Another test was carried out under exactly the same conditions as in Example II, except that the pH was maintained at 8.2 and the bath temperature was adjusted to 80° C. The recovered melamine weighed 33.24 grams and it contained 23.1 percent of the phosphate, 66.5 percent of the Mg, 36.0 percent of the Al, 30.0 percent of the Fe, 18.0 percent of the F, and 9.0 percent of the sulfate in the melamine phosphate charge. The diammonium phosphate product weighed 22.31 grams and it contained 4.0 percent of the Mg, 4.4 percent of the Al, 5.5 percent of the Fe, 4.6 percent of the F, and 3.5 percent of the sulfate that was in the melamine phosphate charge. The remainder of the Mg, Al, Fe, F, and sulfate impurities were present in the filtrate as finely divided particles which passed through the filter. In a process, these suspended impurities would be removed by centrifugation or other means. Most of the unrecovered melamine was dissolved in the wash water from which it would be recovered in a process.

After sifting and winnowing through the data above, as well as other results of tests and operation of our new, novel, and improved method of production for diammonium phosphate, we now present the acceptable and preferred parameters and variables as shown below.

|  | Operating range | Preferred (about) | Most preferred |
| --- | --- | --- | --- |
| Reaction temperature, °C. | 25–115 | 40–105 | 75–95 |
| Retention time, minutes | 1–30 | 3–20 | 5–15 |
| pH | 7.0–10.0 | 7.5–9.5 | 8.5–9.2 |
| Diammonium phosphate crystallization temperature, °C. | 0–100 | 25–75 | 40–50 |
| Weight ratio diammonium phosphate solution to melamine phosphate | 1.5–15 | 2.0–10 | 2.9–4.4 |
| Percent saturation of DAP recycle solution | 40–100 |  |  |
| Percent saturation of DAP dilute wash solution | 5–40 |  |  |

While we have shown and described particular embodiments of our invention, modifications and variations thereof will occur to those skilled in the art. We wish it to be understood, therefore, that the appended claims are intended to cover such modifications and variations which are within the true scope and spirit of my invention.

What we claim as new and desire to secure by Letters Patent of the United States is:

1. A process for the production of purified diammonium phosphate, which comprises the steps of:
   (1) simultaneously introducing into reacting means a stream of relatively concentrated diammonium phosphate solution, a stream of melamine phosphate, a stream of anhydrous ammonia, and a stream of relatively dilute diammonium phosphate wash solution, said stream of relatively dilute diammonium phosphate wash solution recovered from a later-mentioned filtering and washing means, said streams of diammonium phosphate solutions and said stream of melamine phosphate proportioned to one another to maintain in said reactor means a diammonium phosphate:melamine phosphate weight ratio ranging from about 1.5 to about 15, and said stream of anhydrous ammonia proportioned so as to maintain a pH in said reacting means ranging from about 7.0 to about 10.0;
   (2) maintaining a temperature in said reacting means between about 25° C. and about 115° C. and maintaining the materials therein for a period of time ranging from about 1 to about 30 minutes to thereby form therein a slurry comprising diammonium phosphate solution and melamine crystals;
   (3) removing at least a portion of said slurry from said reacting means and introducing same into filtering and washing means; removing from said filtering and washing means a substantially saturated solution of diammonium phosphate; recovering melamine crystals in said filtering and washing means and washing same with a stream of water; removing said washed melamine crystals for recycle to said reacting means; and removing the resulting relatively dilute diammonium phosphate wash solution for introduction into said reactor means in step (1) supra;

(4) introducing said substantially saturated diammonium phosphate removed from said filtering and washing means in step (3) supra into cooling and crystallizing means wherein same is cooled to a temperature ranging from about 0° C. to about 100° C., said cooling of said substantially saturated diammonium phosphate solution therein resulting in supersaturation of the resulting cooled solution and precipitation therein of crystals of diammonium phosphate yielding a slurry thereof;

(5) removing from said cooling and crystallizing means the resulting slurry of diammonium phosphate crystals and relatively concentrated diammonium phosphate solution, and introducing same into filtration means;

(6) separating in said filtration means the resulting relatively concentrated diammonium phosphate solution, removing same therefrom and introducing same into said reacting means; simultaneously removing from said filtration means the resulting crystalline diammonium phosphate; introducing same into drying means; and recovering from said drying means the resulting diammonium phosphate as product.

2. The process of claim 1 wherein the weight ratio of diammonium phosphate:melamine phosphate in said reacting means is maintained in a range from about 2 to about 10; wherein the pH in said reacting means is maintained in a range from about 7.5 to about 9.5; wherein the temperature in said reacting means is maintained in a range from about 40° to about 105° C.; wherein the residence time of the materials in said reacting means ranges from about 3 to about 20 minutes; and wherein the temperature in said cooling and crystallizing means is maintained in the range of about 25° to about 75° C.

3. The process of claim 1 wherein the weight ratio of diammonium phosphate:melamine phosphate in said reacting means is maintained in a range from about 2.9 to about 4.4; wherein the pH in said reacting means is maintained in a range from about 8.5 to about 9.2; wherein the temperature in said reacting means is maintained in a range from about 75° C. to about 95° C.; wherein the residence time of the materials in said reacting means ranges from about 5 to about 15 minutes; and wherein the temperature in said cooling and crystallizing means is maintained in the range of about 40° to about 75° C.

4. The processes of claims 1, 2, or 3 wherein the concentration of said diammonium phosphate solution introduced into said reacting means ranges from about 40 percent to about 100 percent saturation, and wherein the concentration of said dilute diammonium phosphate wash solution introduced into said reacting means ranges from about 5 percent to about 40 percent saturation.

* * * * *